Nov. 2, 1954 D. A. JOHNSON ET AL 2,693,141
TILTABLE POP-UP TOASTER
Filed Jan. 5, 1951 3 Sheets-Sheet 1
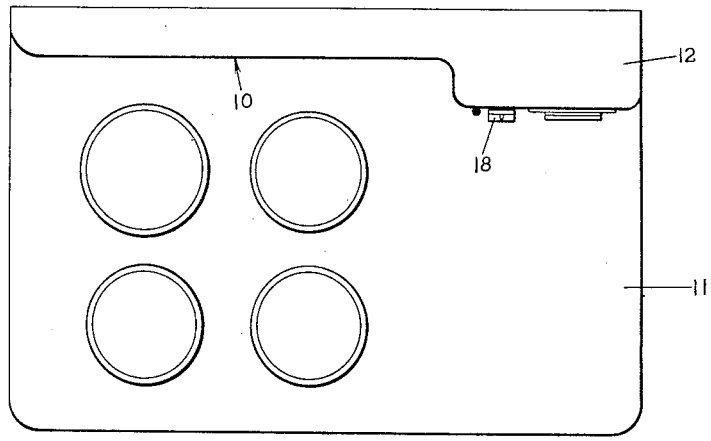
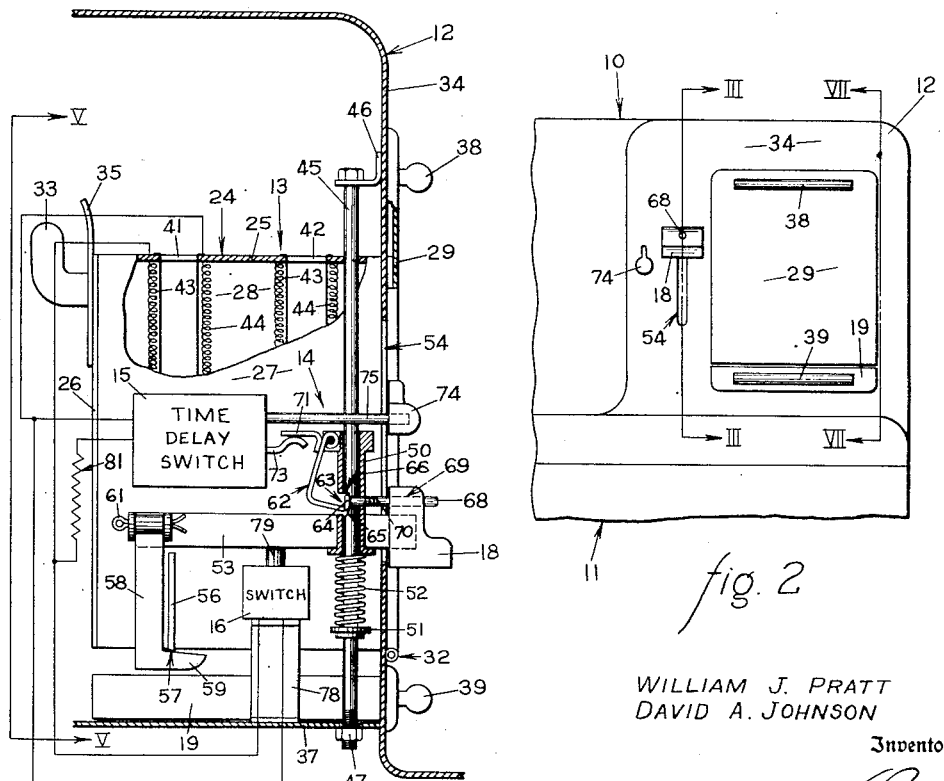
WILLIAM J. PRATT
DAVID A. JOHNSON
Inventors
Attorney Nov. 2, 1954    D. A. JOHNSON ET AL    2,693,141
TILTABLE POP-UP TOASTER
Filed Jan. 5, 1951    3 Sheets-Sheet 2
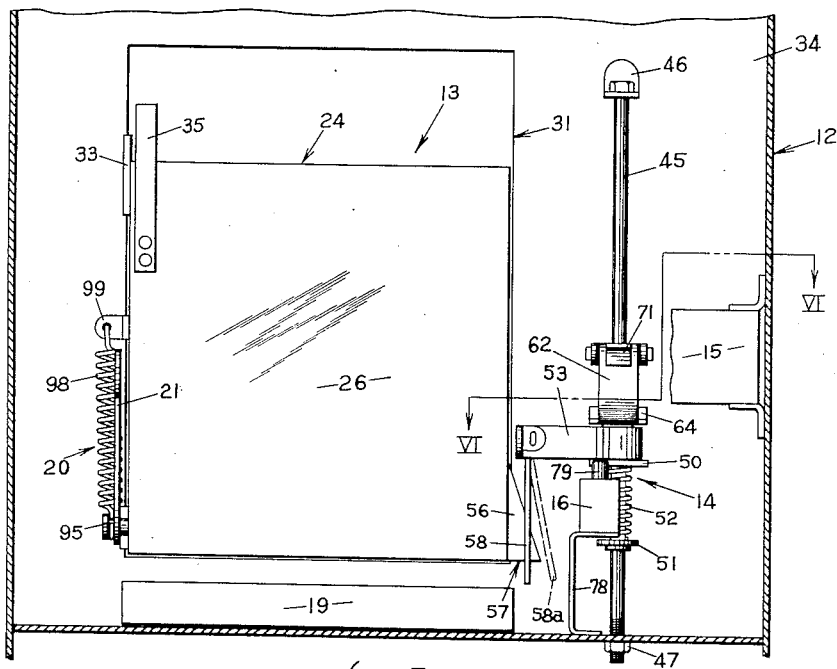
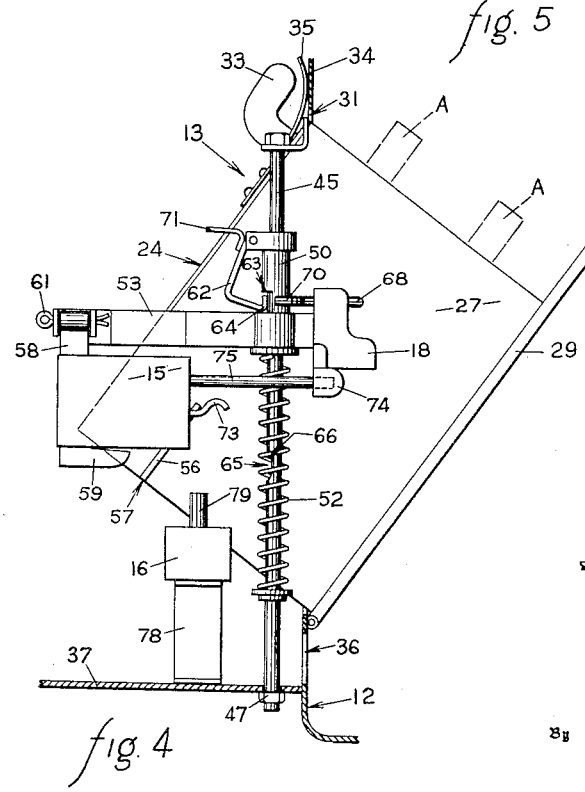
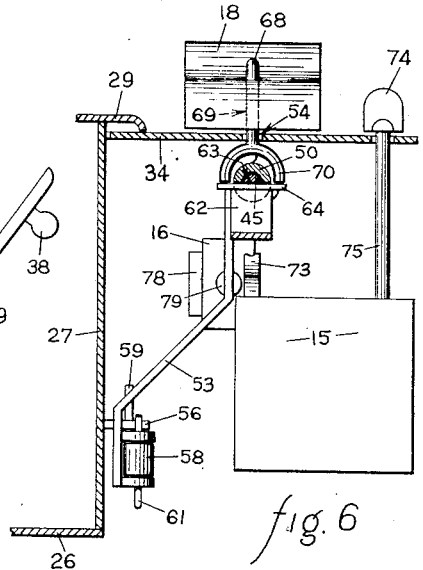
WILLIAM J. PRATT
DAVID A. JOHNSON    Inventors
Attorney

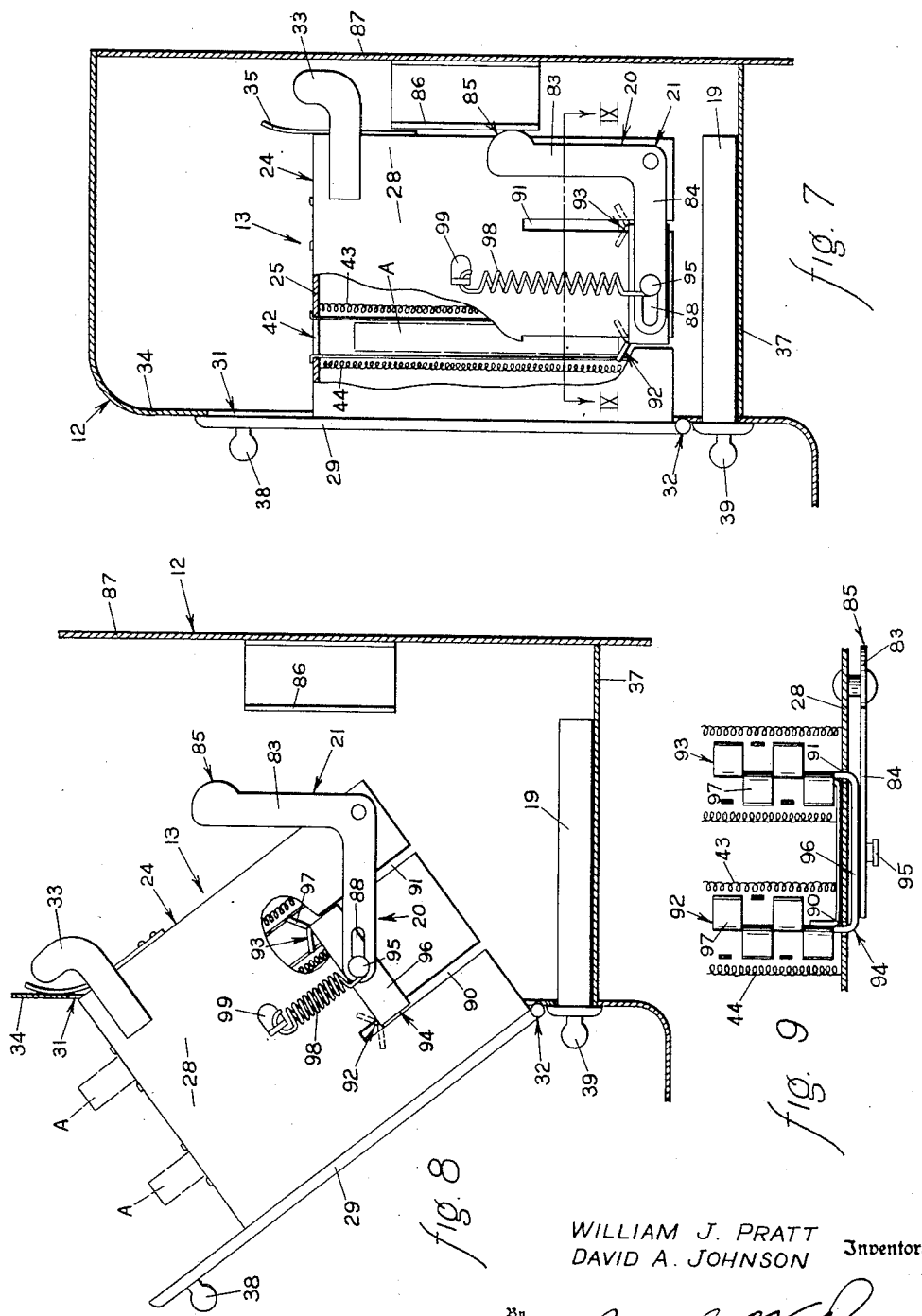

United States Patent Office 2,693,141
Patented Nov. 2, 1954

2,693,141

TILTABLE POP-UP TOASTER

David A. Johnson, St. Joseph, and William J. Pratt, Bridgman, Mich., said Johnson assignor to said Pratt Application January 5, 1951, Serial No. 204,626

6 Claims. (Cl. 99—326)

This invention relates in general to an automatic, pop-up, electric toaster and more particularly to a type thereof mountable upon a substantially vertical panel and tiltable with respect thereto.

Manufacturers of kitchen equipment are constantly confronted with the problem of reducing the space requirements of such equipment commensurate with utility and satisfactory operation. Up to the present time, insofar as we are aware, automatic toasters, which have become an extremely important, if not a necessary, piece of the kitchen equipment in an average household, have been provided an independent articles for which special storage space must be provided and which are normally brought out from and returned to such storage space numerous times during each week.

As a result of the modern trend toward small, compact kitchens, particularly in the conventional "story and a half" domestic dwelling, the amount of storage space in the kitchen has been greatly reduced. In many instances, for the sake of convenience and in order to relieve the lack of cupboard space, toasters are frequently left in the open on tables or preparation boards where they not only obstruct operations but also collect dust and dirt.

In view of the above facts, we have conceived the idea of providing an automatic, pop-up type, electric toaster mountable upon and disposable within an item of standard kitchen equipment, such as a range or cookstove. By so doing, the above problems, as well as many others incidental thereto, are greatly reduced, if not completely eliminated.

Accordingly, a primary object of this invention is the provision of an automatic, pop-up type, electric toaster which is mountable upon and thereby becomes an integral part of an item of standard kitchen equipment, such as a range.

A further object of this invention is the provision of a dependent toaster, as aforesaid, having utility both domestically and commercially.

A further object of this invention is the provision of an electric toaster, as aforesaid, adaptable to installation upon a substantially vertical panel, such as the instrument panel extending upwardly from the rear end of a conventional kitchen range, with only a slight modification in the present design of such panels.

A further object of this invention is to provide a toaster, as aforesaid, which is tiltable into and out of a position within a chamber partially defined by said vertical panel so that the toasting mechanism, as well as the slots into which the toast is inserted between said elements, are completely obscured from view, except when the toaster is being loaded or unloaded, thereby preventing contamination of the toaster and/or its contents from air borne dust and dirt.

Other objects of this invention will become apparent to persons familiar with this type of equipment upon reading the following specification and upon referring to the accompanying drawings wherein:

Figure 1 is a top plan view of a range with our toasting unit mounted therein.

Figure 2 is a fragmentary, front elevation of that portion of a range in which said toasting unit is mounted.

Figure 3 is a broken, sectional view substantially as taken along the line III—III of Figure 2 and showing the control handle in toasting position.

Figure 4 is a broken, sectional view substantially as taken along the line III—III of Figure 2 with the toast housing in a tilted position.

Figure 5 is a broken, rear elevation of our toasting unit substantially as viewed from the cutting plane V—V of Figure 3.

Figure 6 is a broken, sectional view substantially as taken along the line VI—VI of Figure 5.

Figure 7 is a sectional view substantially as taken along the line VII—VII of Figure 2.

Figure 8 is a sectional view substantially as taken along the line VII—VII of Figure 2 with the toast housing in a tilted position.

Figure 9 is a sectional view taken along the line IX—IX of Figure 7.

GENERAL DESCRIPTION

As illustrated in the drawings, particularly Figures 1, 2, 3, 5 and 7, the instrument section 10 of the range 11, said range being selected for illustration purposes only, is provided with an enlarged portion 12 in which a toasting unit 13 is housed and supported, said unit having a toast housing 24 pivotally supported for movement from a position substantially as shown in Figures 3 and 7 to a position substantially as shown in Figures 4 and 8. A tilting mechanism 14 (Figures 3 and 4) is provided for automatically effecting said pivotal movement. A time delay switch 15, which is energized by the control switch 16, trips the tilting mechanism 14, after it is manually cocked, whereby the toast housing 24 is tilted into the position shown in Figures 4 and 8.

The control handle 18 which is manually and vertically actuable, as hereinafter shown, provides means for manually cocking the actuating mechanism 14 prior to the actuation thereof effecting the tilting of the toast housing 24.

A crumb tray 19 is removably disposed in the enlarged portion 12 of the instrument section 10 directly below the toast housing 24 for obvious reasons.

The toasting unit 13 includes an ejector mechanism 20 whereby toast is automatically ejected from the housing 24 when said housing is pivoted from its erect position as shown in Figure 7 to its tilted position shown in Figure 8.

For purpose of convenience in description, the terms "inwardly" and "outwardly" shall be understood to have reference to the geometric center of the toasting unit. The terms "upper" or "upwardly" and "lower" or "downwardly" shall have reference to the toasting unit when positioned and/or operating in its normal manner of use. The terms "forwardly" and "rearwardly" shall have reference, respectively, to the conventional forward and rearward ends of the range 11.

DETAILED DESCRIPTION

In this particular embodiment of our invention, the toasting unit 13 (Figures 3, 5 and 7) is, for illustrative purposes only, disclosed and illustrated as housed within an enlarged portion 12 at one end of the instrument section 10 of an electric range 11. However, as this description proceeds, it will become apparent that the toasting unit 13 may be mounted upon any substantially vertical panel having appropriate space in front and back thereof and an opening in the panel through which the toast housing 24 may tilt.

As shown in Figures 2, 3, 5, 7 and 8, the toast housing 24 is comprised of a top wall 25, rear wall 26, end wall 27, end wall 28 and front wall or door 29. The forward panel 34 of the enlarged portion 12 is provided with a rectangular opening 31 (Figures 4 and 8) through which the housing 24 is receivable. The lower edge of the door 29 is provided with a hinge 32 by means of which the housing 24 is pivotally supported upon the panel 34 adjacent to the lower edge of the opening 31 therein. Pivotal movement of the housing 24 in a counterclockwise direction, as appearing in Figures 3 and 4, is limited by engagement between the door 29 and the panel 34. Clockwise rotation of the housing 24, as appearing in Figures 3 and 4, is limited by engagement between the stop member 33, which is secured as by welding to the end wall 28, and the rearward side of panel 34. A resilient means, such as the strip spring 35, may be secured to the rear wall 26 of the housing 24 for cushioning the engagement between the stop member 33 and the panel 34.

A drawer opening 36 is provided in the panel 34 directly below the housing opening 31 for slidably receiving the crumb tray 19, which tray is disposable under the complete toast housing 24. A horizontal base plate 37 mounted upon and within the enlarged portion 12 beneath the crumb tray 19 provides, among other things, for the support of the crumb tray 19. Both the crumb tray 19 and the door 29 are provided with handles 38 and 39, respectively, to facilitate manual operation thereof.

The top wall 25 of the housing 24 is provided with a pair of spaced, parallel slots 41 and 42 (Figure 3) which are both preferably parallel with the door 29 and of suitable width and length to permit insertion of a slice of bread therethrough. A pair of parallel heating elements 43 and 44 of any convenient, conventional type are disposed within the housing 24 on opposite sides of the slots 41 and 42.

Tilting mechanism

The major part of the tilting mechanism 14 (Figures 3, 4, 5 and 6), whereby the housing 24 is pivoted from its position in Figure 3 through the unit opening 31 to its position in Figure 4, is vertically slidably supported upon a guide rod 45 which is secured at its upper end to the panel 34, by means of the bracket 46, and secured at its lower end to the base plate 37, as by the nut 47. The guide rod 45 is disposed parallel with and adjacent to both the inside surface of the panel 34 and the end wall 27 of the housing 24.

A sleeve 50 is slidably supported on the guide rod 45 (Figures 3, 4 and 6) between the bracket 46 and a stop collar 51 secured to the guide rod 45 near the lower end thereof. A coil spring 52 is sleeved upon the guide rod 45 between the sleeve 50 and the stop collar 51. A horizontal, actuating arm 53, which extends along the end wall 27, is secured to the sleeve 50 near the lower end thereof, as by welding. One end of the arm 53 extends through a suitable, vertically disposed slot 54 in the panel 34 (Figures 2 and 3). A control handle 18 is secured to that end of the arm 53 extending forwardly of the panel 34, whereby the sleeve 50 may be manually moved upwardly and downwardly on the guide rod 45.

A strike 56, which is secured to the end wall 27 of the housing 24, substantially parallel with the rear wall 26, has a substantially horizontal lower edge 57 preferably adjacent to the lower edge of the end wall 27. The strike 56 extends toward and beneath the actuating arm 53. A latch 58, having a hook 59 at its lower end, is pivotally supported at its upper end by means of the cotter pin 61 upon the actuating arm 53 remote from the panel 34 for rotation in a plane substantially parallel with the strike 56. The latch 58 is so disposed that when the housing 24 is in its erect position and the sleeve 50 is in its lower position, thereby compressing the spring 52 (Figure 3), the hook 59 is engageable with the edge 57 of the strike 56.

The spring 52 is selected so that it will urge the sleeve 50 upwardly beyond a point where the latch 58, indirectly supported thereon, can engage the strike 56, regardless of the position of the housing 24.

An L-shaped pawl 62 is pivotally supported at its upper end upon the upper end of the sleeve 50 preferably on that side thereof remote from the panel 34. The sleeve 50 is provided with an opening 63 through the side wall thereof for reception of the horizontal lock bar 64 on the lower end of the pawl 62. A notch 65 having a substantially horizontal upper wall 66 is provided in the guide rod 45 for registry with the opening 63 in the sleeve 50 when the sleeve is in its said lower position. Thus, when the sleeve 50 is in said lower position, said lock bar 64 is urged by gravity through the opening 63 into the notch 65 and engagement with the upper wall 66 of the notch 65, thereby holding the sleeve against upward urging by the spring 52. The lock bar 64 of the pawl 62 extends laterally sidewardly beyond both sides of the sleeve 50 for reasons apparent hereinafter.

A rod 68, which is slidably supported within an appropriate horizontal opening 69 through the control handle 18 extends through the vertical slot 54 in the panel 34. A yoke 70, which is secured intermediate its ends to the inner end of the rod 68, partially surrounds the sleeve 50 for engagement with the laterally extending ends of the lock bar 64, whereby movement of the rod 68 toward the guide rod 45 effects manual disengagement of the pawl 62 from the notch 65 in said guide rod.

A substantially horizontal lever 71 is secured to the pawl 62, as by welding, near the upper end thereof and extends rearwardly therefrom. A time delay switch 15 (Figures 3, 4 and 5), which may be of the bimetallic element type, is supported upon the inside wall of the enlarged portion 12 in any convenient, conventional manner and positioned so that an actuating finger 73, extending therefrom and actuated thereby, is engageable with the lower side of the lever 71 on the pawl 62. Accordingly, upward movement of the actuating finger 73 rotates the pawl 62 out of the position (Figure 3) where the locking bar 64 can engage the upper wall 66 of the notch 65. The delay characteristic of the switch 15 is controlled by the knob 74 which is disposed externally of the enlarged portion 12 and connected to said switch 15 by the rod 75.

A normally open, control switch 16, such as a microswitch (Figures 3, 4, 5 and 6), is mounted upon the base plate 37 by means of the support bracket 78 so that the actuating plunger 79 thereof extends vertically upwardly for engagement by the actuating arm 53 of the tilting mechanism 14. The switch 16 is so disposed that it will be closed when the sleeve 50, hence the actuating arm 53, is in said lower position.

As shown in Figure 3, the heating elements 43 and 44 of the toast housing 24 are in a series circuit with the control switch 16, and, therefore, can not be energized until said switch 16 is closed by the actuating arm 53. The time delay switch 15, which is in parallel with the heating elements 43 and 44, and on the output side of the control switch 16, has a large resistance 81 in series therewith so that only a small, predetermined amount of current is fed to the time delay switch 15. Thus, upon closing of the switch 16, the heating elements 43 and 44 and the time delay switch 15 are energized simultaneously, and deenergized also simultaneously upon opening of the switch 16.

Toast ejecting mechanism

As shown in Figures 5, 7, 8 and 9, the ejector mechanism 20 is comprised of a bell crank 21 having perpendicularly disposed legs 83 and 84 pivotally supported at the intersection of said legs on the end wall 28 of the housing 24 adjacent to the rear and lower corner thereof for movement in a plane substantially parallel with the end wall 28. The vertical leg 83, as appearing in Figure 7, is provided with an integral cam follower 85 at the upper end thereof and extending rearwardly therefrom for engagement with a cam 86 mounted on the rearward wall 87 of the enlarged portion 12. Although, in this particular embodiment, the cam 86 is vertical, it might, for example, under some circumstances be forwardly curved at its upper end thereby delaying the toast ejecting operation hereinafter described, and such is contemplated in this invention. The forward end of the horizontal leg 84 of the bell crank 21 (Figure 7) is provided with a lost motion slot 88 substantially parallel therewith.

A pair of vertical slots 90 and 91 are provided in the end wall 28 so that they are each disposed, respectively, midway between the two pairs of heating elements 43 and 44 in the housing 24. The parallel legs 92 and 93 of a U-shaped ejector 94 extend through the slots 90 and 91, respectively, and substantially to the end wall 27 of the housing 24. A pin 95 secured to the web 96 of the ejector 94 extends through and beyond the lost motion slot 88 in the horizontal leg 84. The upper edges of the legs 92 and 93 are provided with integral ears 97 which are bent alternately forwardly and rearwardly of the said legs for engaging and supporting the lower edge of a slice of bread A. A brace 89 (Figure 9) is secured between the legs 92 and 93 adjacent to, and inwardly of, the wall 28.

A resilient means, such as a coiled spring 98, is secured at its lower end to the pin 95 and at its upper end to the bracket 99 which is secured in any convenient manner to the end wall 28 directly above the pin 95. Thus, when the housing 24 is in a position shown in Figure 7, spring 98 is under considerable tension, but engagement between the cam follower 85 and the cam 86 prevents a clockwise rotation of the bell crank 21, hence an upward movement of the ejector 94, by the spring 98. However, as the unit housing 24 is tilted forwardly into the position shown in Figure 8 the cam follower 85 is moved away from the cam 86 in this embodiment thereby permitting the spring 98 to draw the ejector 94 upwardly.

It will be recognized that by slight modification of the ejector mechanism 20, hereinabove described, the bell crank 21 may be disposed intermediate the end walls 27 and 28, or alternatively, another bell crank 21 with its associated parts may be disposed adjacent to the end wall 27, and such possibility is contemplated in this invention.

Likewise modifications in the specific structure described with reference to the tilting mechanism 14, hereinabove, as well as the circuitry and switches utilized therewith, which lie within the scope of this invention and which would produce the same functional operation, as hereinafter disclosed in detail, are also contemplated by this invention.

OPERATION

Under normal circumstances and prior to use of our toasting unit 13, the housing 24 is in the erect position (Figure 3), the tilting mechanism 14 is in the raised or upper position (Figure 4), the ejector mechanism 20 is in the position shown in Figure 7 and the control handle 18 is in the raised position shown in Figure 2. Thus, when it becomes desirable to toast bread, or other food normally toasted in an automatic, pop-up type toaster, the housing 24 is manually tilted forwardly about the hinge 32 by means of the handle 38. Slices of bread A are inserted through the slots 41 and 42 in the top wall 25 of the housing 24, the housing 24 is tilted rearwardly into the position shown in Figures 3 and 7. During such rearward tilting, the bell crank 21 is rotated counter-clockwise (Figure 8) by engagement between the cam follower 85 and the cam 86, thereby urging the ejector 94, toward, and ultimately to, the bottom of the housing 24 (Figure 7). The housing opening 31 in the panel 34 of the enlarged portion 12 is of sufficient height to allow for clearance of the bread A as the housing 24 is urged rearwardly. Likewise, the door 29 is sufficiently large to completely cover the housing opening 31. The toasting unit 13 may remain in the erect position (Figures 3 and 7) until such time as it becomes desirable to toast the slices of bread A now disposed therein.

When such becomes desirable, the portion of the tilting mechanism 14 mounted on the sleeve 50 is urged downwardly into its lower position by manual depression of the control handle 18 where the lock bar 64 of the pawl 62 engages the upper wall 66 of the notch 65 in the guide rod 45. During such movement, (1) the spring 52 is compressed between the sleeve 50 and the stop collar 51, (2) the latch 58 is pivoted away from the end wall 27 into the broken line position 58a (Figure 5) by the adjacent side of the strike 56, (3) the hook 59 slides under and engages the edge 57 of said strike 56, and (4) the actuating arm 53 engages the actuating plunger 79 of the switch 16, thereby closing same and permitting the flow of current both to the time delay switch 15 and the heating elements 43 and 44, simultaneously.

Engagement between the pawl 62 and the notch 65 in the guide rod 45 prevents the spring 52 from urging the sleeve 50, and the parts supported thereon, upwardly. After a predetermined period of time, which may be preselected by the control 74, the time delay switch causes its actuating finger 73 to move upwardly, engage the lever 71 and rotate the pawl 62 in a clockwise direction (Figure 3) thereby effecting disengagement of the lock bar 64 from the notch 65 in the guide rod 45. This permits the spring 52 to push the sleeve 50 and actuating arm 53, supported thereon, upwardly. Such upward movement, translated through latch 58 and the strike 56, causes the housing 24 to tilt forwardly into the position shown in Figures 4 and 8. During such upward movement (1) the switch 16 is opened, thereby de-energizing the heating elements 43 and 44, as well as the time delay switch 15, (2) the bell crank 21 is rotated clockwise by the spring 98, which in turn causes the ejector 94 to move upwardly, thereby ejecting the toast from the housing 24. Forward tilting of the housing 24 is positively limited by engagement between the stop member 33 and the panel 34 such engagement being cushioned by the resilient strip 35, also secured to the housing 24 and also engaging said panel 34.

The toasted bread may now be removed and replaced by additional slices of bread to be toasted, in which case the above described toasting cycle is repeated. However, if the toaster is not being used again, it can be completely closed up until further use is desired by manually moving the housing 24 from the tilted position (Figure 4) to the erect position (Figure 3) with the tilting mechanism 14 remaining in the raised position (Figure 4).

If, while using the toasting unit 13, visual inspection of its contents becomes desirable, such may be accomplished by manually tilting the housing 24 forwardly. Further, if it becomes desirable either to shorten the toasting period without changing the setting of the knob 74, or to shut off the current to the heating elements 43 and 44 for any reason, such may be accomplished by manually urging the rod 68 rearwardly toward the panel 34, thereby causing the yoke 70, secured to the rearward end thereof, to disengage the lock bar 64 of the pawl 62 from the notch 65 in the guide rod 45. This initiates the same action effected, as described above, when the pawl 62 is tripped by the actuating finger 73 of the time delay switch 15. The bottom of the unit housing 24 is preferably left open so that any crumbs dropping during the toasting operation may be collected in the tray 19 for easy disposal.

Although the above mentioned drawings and description apply to one particular preferred embodiment of the invention, it is not our intention, implied or otherwise, to eliminate other variations or modifications which do not depart from the scope of the invention unless specifically stated to the contrary in the hereinafter appended claims.

We claim:

1. In means effecting automatic, tilting of a toast housing about a lower edge thereof from an erect position through an arc of between about 30° and about 60°, said housing containing heating elements, the combination comprising: support means hingedly engaged to said lower edge of said housing; a vertical rod secured to said support means and having a notch therein; a sleeve slidably disposed upon said rod and resilient means yieldably resisting movement of said sleeve into its lower position; an arm secured to said sleeve and a latch pivotally suspended therefrom for movement in a plane substantially perpendicular to said arm, said latch having a hook at its lower end; a strike on said housing engageable therebeneath by said hook when said housing is in the erect position and when said sleeve is in its lower position; a pawl piotvally supported upon said sleeve and engageable with said notch when said sleeve is in its lower position, thereby preventing upward movement of said sleeve by said resilient means; an electrically responsive time delay switch and means on said pawl actuable by said switch for disengaging said pawl from said notch; a source of electric energy, and a series switch connected to said source and actuable by said arm when said sleeve is in its lower position for energizing said heating elements and said time switch simultaneously.

2. In means effecting automatic tilting of a toaster housing about its lower edge, said housing containing heating elements, the combination comprising: support means hingedly engaging said lower edge; a vertical rod fixed with respect to said support means and having a first hook fixed with respect to said rod; a slider slidably disposed upon said rod and resilient means yieldably resisting downward movement of said slider; a latch pivotally mounted on said slider for movement in a plane substantially parallel to said rod; said latch including a downwardly extending second hook; a strike on said housing engageable by said second hook when said housing is in its erect position and said slider is in a lowered position; a pawl pivotally supported upon said slider and engageable with said first hook when said slider is in its lower position thereby preventing upward movement of said slider by said resilient means; an electrically responsive time delay switch and means actuable by said switch for disengaging said pawl from said first hook; means connectable to a source of electrical energy and a switch connected in series therewith actuable by a portion of said latch structure when said slider is in its lower position for simultaneously energizing said heating elements and said time delay switch.

3. In means effecting automatic tilting of a toaster housing about its lower edge, said housing containing heating elements, the combination comprising: support means hingedly engaging said lower edge; a vertical rod fixed with respect to said support means and having a first hook fixed with respect to said rod; a slider slidably disposed upon said rod and resilient means yieldably resisting downward movement of said slider; latch structure including a substantially horizontal portion and a substantially vertical portion supported by said slider for movement of said substantially vertical portion in a vertically positioned plane, said latch having a second hook at the lower end of said substantially vertical portion; a strike on said housing engageable by said second hook when said housing is in its erect position and said sleeve in a lowered position; a pawl pivotally supported upon said sleeve and engageable with said first hook when said slider is in its lower position thereby preventing upward movement of said slider by said resilient means; an electrically responsive time delay switch and means actuable by said switch for disengaging said pawl from said first hook; means connectable to a source of electrical energy and a switch connected in series therewith actuable by the substantially horizontal portion of said latch structure when said slider is in its lower position for simultaneously energizing said heating elements and said time delay switch.

4. In means effecting automatic tilting of a toaster housing about its lower edge, said housing containing heating elements, the combination comprising: support means hingedly engaging said lower edge; a vertical rod fixed with respect to said support means and having a first hook fixed with respect to said rod; a slider slidably disposed upon said rod and resilient means yieldably resisting downward movement of said slider; a strike on said housing; manually operable means including a horizontally pivoted portion and a second hook movable with said slider for engaging said strike when said housing is in its erect position and said slider in a lowered position; a pawl pivotally supported upon said sleeve and engageable with said first hook when said slider is in its lower position thereby preventing upward movement of said slider by said resilient means; an electrically responsive time delay switch and means actuable by said switch for disengaging said pawl from said first hook; means connectable to a source of electrical energy and a switch connected in series therewith actuable by a portion of said latch structure when said slider is in its lower position for simultaneously energizing said heating elements and said time delay switch.

5. In a toasting unit mountable on a side wall of an electric stove having an opening through said side wall, the combination comprising: a housing containing a pair of spaced heating units and receivable through said opening and substantially entirely interiorly of said side wall, said housing being hinged along the outer edge thereof upon said wall along an edge of said opening and limit means on said housing engageable with the interior of said panel for limiting outward movement of said housing about said hinge when said housing has moved approximately half way out of said chamber; a vertical rod mounted to the interior of said side wall and spaced laterally from said housing; an electrically energized time delay switch having a finger movable upon the expiration of a predetermined time and an on-off switch, both mounted fixedly with respect to said side wall and at one side of said housing; a slider on said rod and means resiliently urging said slider upwardly; a strike mounted on said housing and extending sidewardly therefrom; latch means on said slider manually engageable with said strike and further means associated with said latch means for closing said on-off switch when said slider is in a lowered position; a hook arranged fixedly with respect to said housing and a pawl on said slider engageable with said hook when said slider is in a lowered position for holding same in said lowered position; means reactive to movement of said finger for disengaging said pawl from said hook; means connectable to a source of electrical energy and a circuitry connecting said on-off switch in series with said heating elements and with said time delay switch, said time delay switch and said heating elements being connected parallel with each other.

6. In a toasting unit mountable on a side wall of an electric stove having an opening through said side wall, the combination comprising: a housing containing a pair of spaced heating units and receivable through said opening and substantially entirely interiorly of said side wall, said housing being hinged along the outer edge thereof upon said wall along an edge of said opening and limit means on said housing engageable with the interior of said housing for limiting outward movement of said housing about said hinge when said housing has moved approximately half way out of said chamber; a vertical rod mounted on the interior of said side wall and spaced laterally from said housing; an electrically energized time delay switch and an on-off switch, both mounted fixedly with respect to said side wall and at one side of said housing; a slider on said rod and means resiliently urging said slider upwardly; a strike mounted on said housing and extending sidewardly therefrom; latch means on said slider manually engageable with said strike; means associated with said slider for closing said on-off switch when said slider is in a lowered position; retaining means fixed with respect to said housing and other means engageable with said retaining means for holding said slider in said lowered position; means reactive to timing out of said time delay switch for disengaging said other means from said retaining means and thereby permitting said slider to move upwardly on said rod; means connectable to a source of electrical energy and connecting said on-off switch in series with said heating elements and with said time delay switch, said time delay switch and said heating elements being connected in parallel with each other.

References Cited in the file of this patent

UNITED STATES PATENTS

| Number | Name | Date |
|---|---|---|
| 1,717,979 | Hummel et al. | June 18, 1929 |
| 1,769,893 | Uhl | July 1, 1930 |
| 1,989,933 | Kahn | Feb. 5, 1935 |
| 2,092,226 | Simons | Sept. 7, 1937 |
| 2,121,444 | Osrow | June 21, 1938 |
| 2,251,925 | Edmunds et al. | Aug. 12, 1941 |
| 2,274,810 | Sardeson | Mar. 3, 1942 |
| 2,504,445 | Pavnica | Apr. 18, 1950 |